Patented May 11, 1937

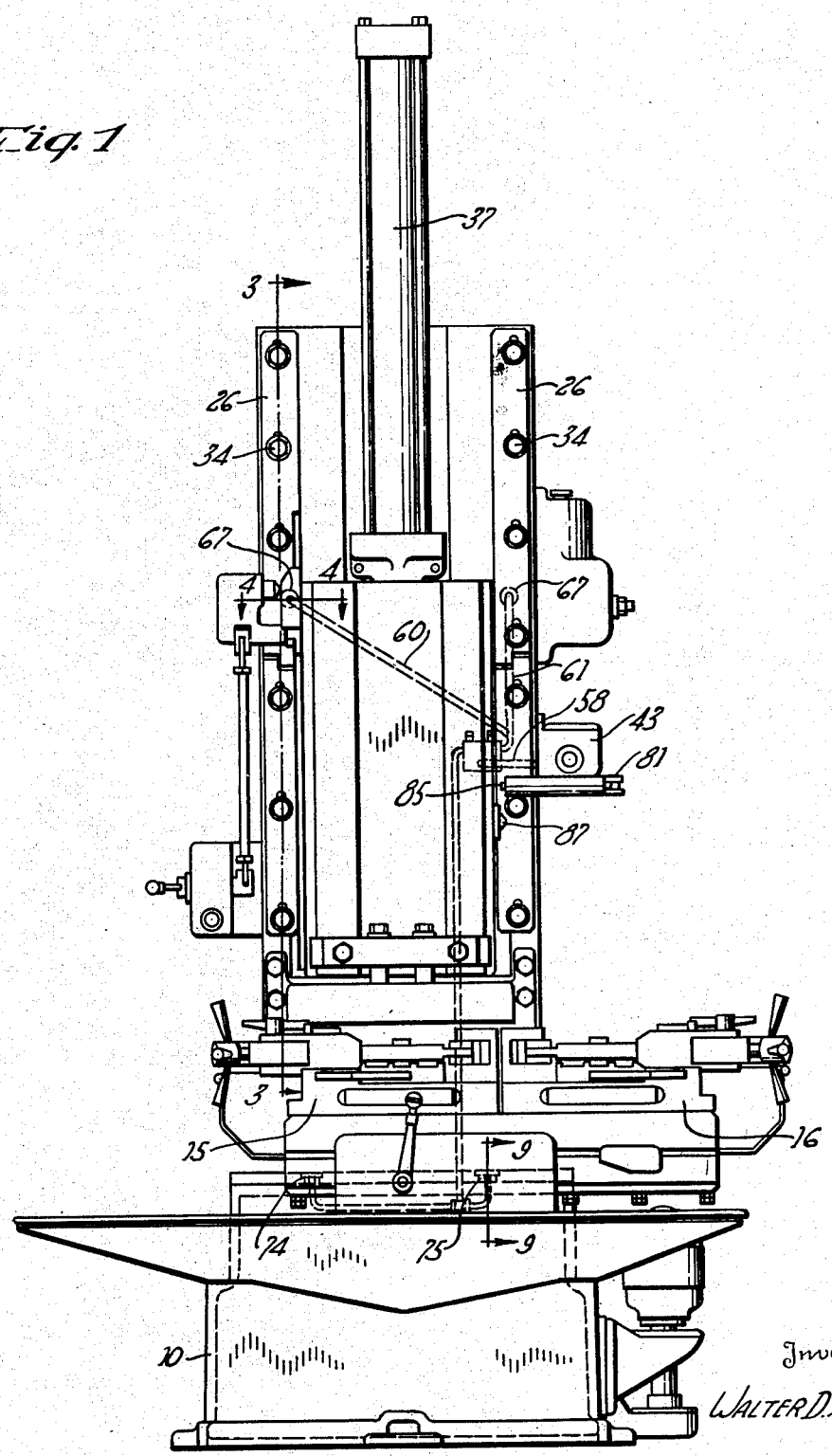

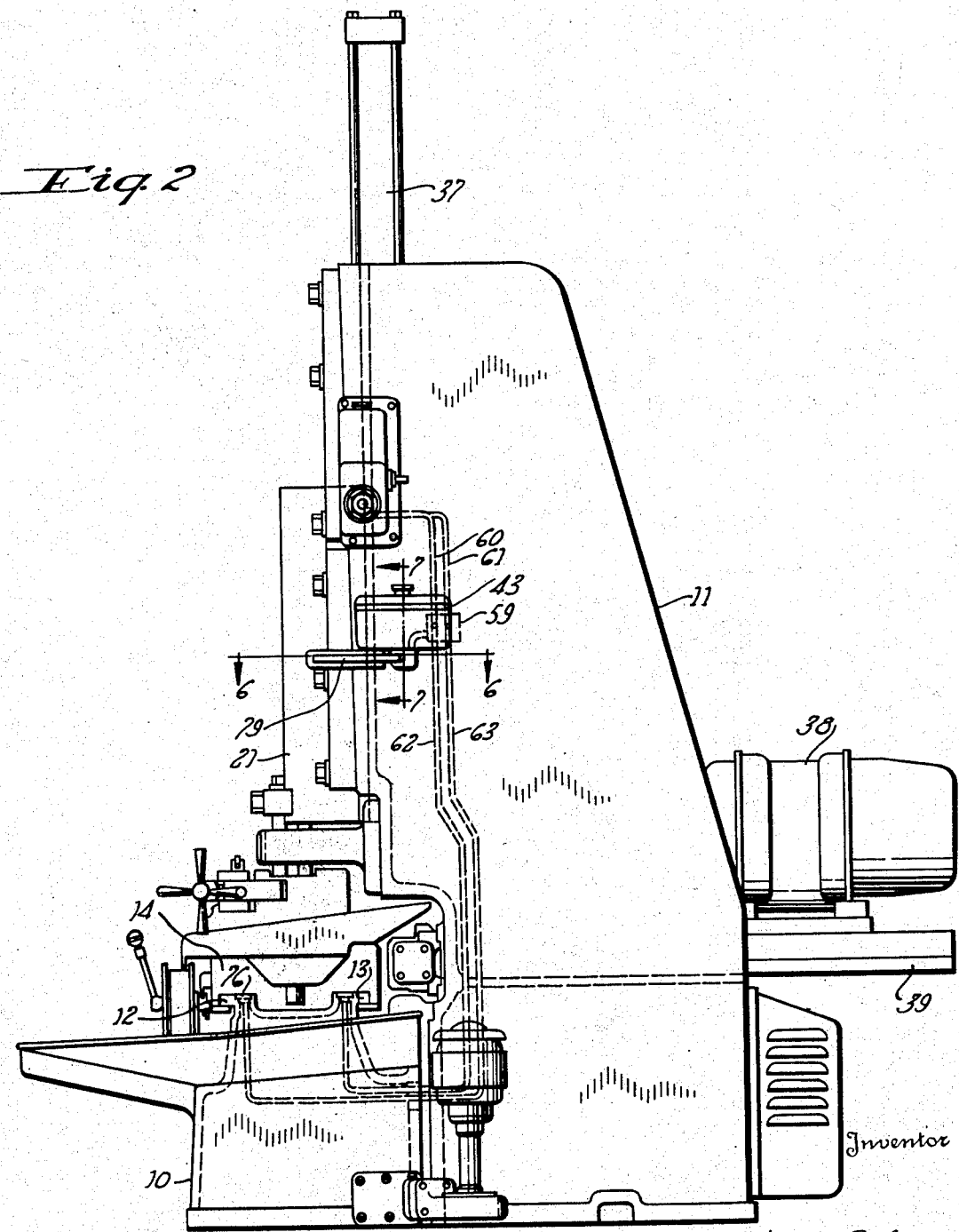

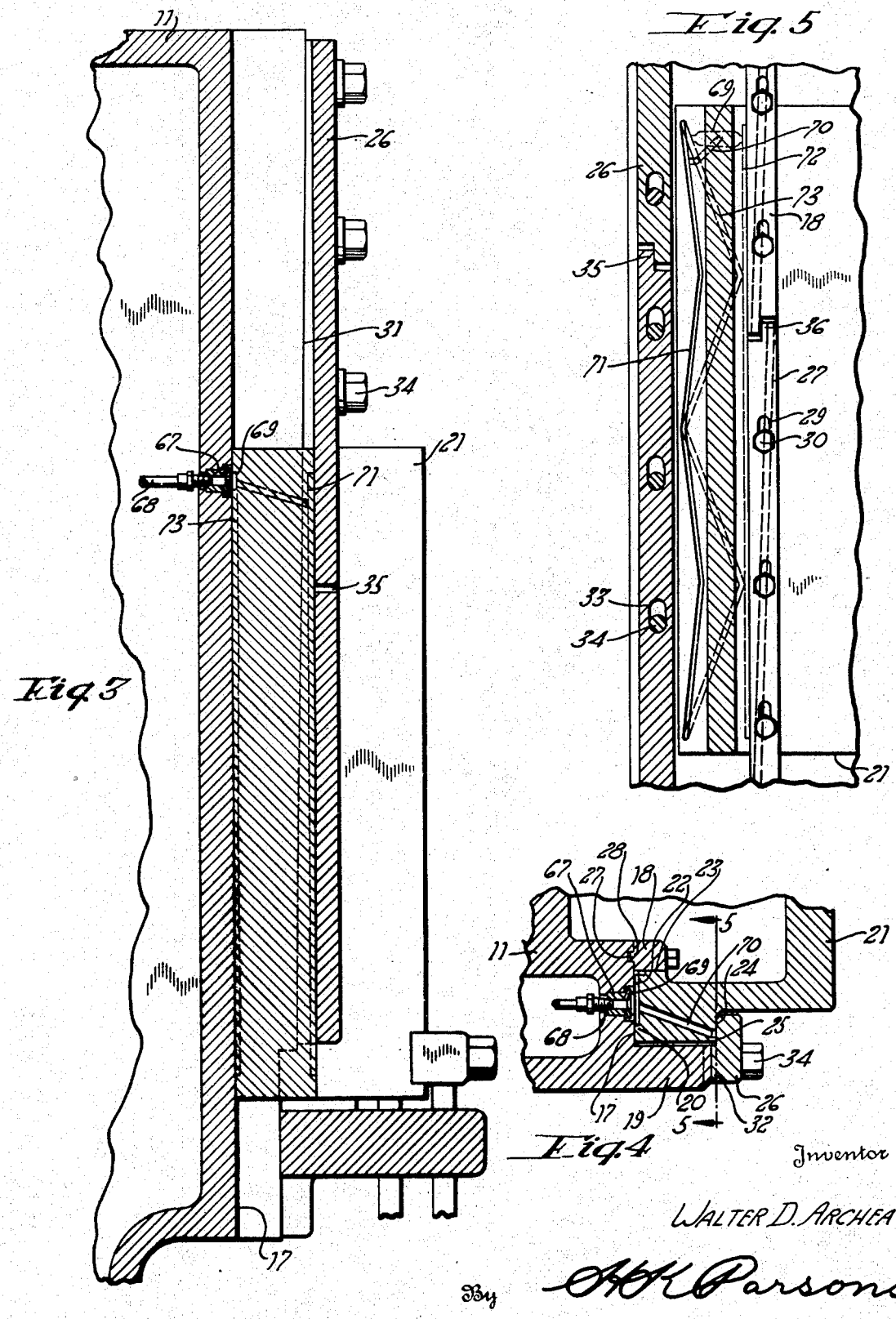

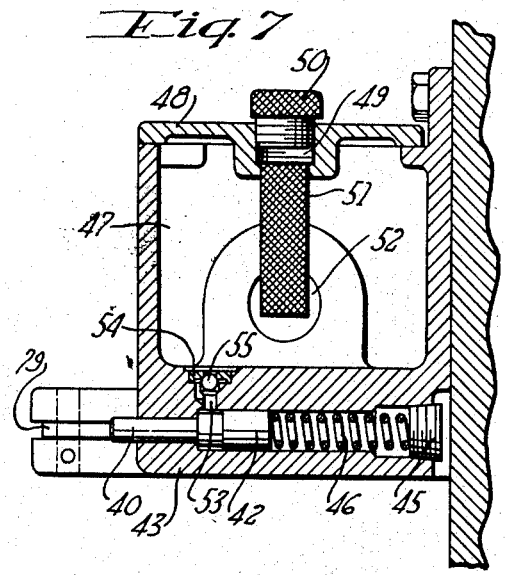
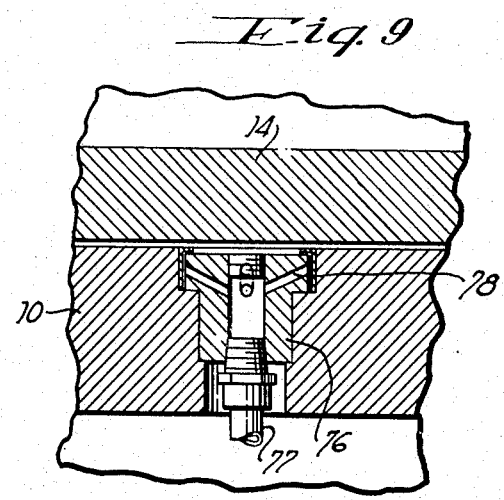
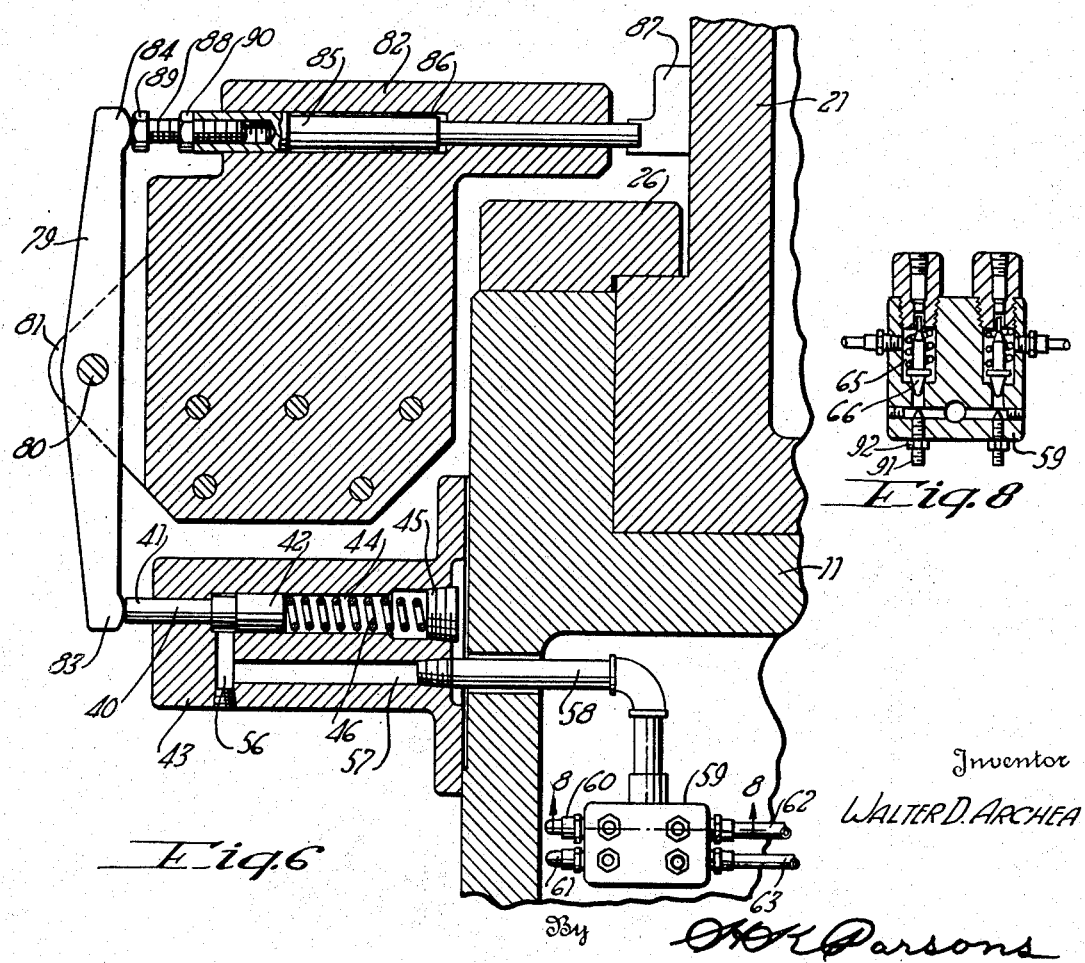

2,079,700

UNITED STATES PATENT OFFICE 2,079,700

MACHINE TOOL ORGANIZATION

Walter D. Archea, Norwood, Ohio, assignor to The Cincinnati Milling Machine Co., Cincinnati, Ohio, a corporation of Ohio Application May 31, 1934, Serial No. 728,327

6 Claims. (Cl. 184—6)

This invention relates to improvements in machine tool structures and particularly to automatic means for lubricating the guide ways thereof for reciprocating members as especially adapted to the various types of broaches in which the broach tool ram is movable in a rectilinear direction.

Another object of the invention is the provision of improved automatic lubricating means for simultaneously and automatically lubricating the guide ways of a plurality of members of a machine tool organization.

A further object of the invention is the provision of improved means for guiding the said reciprocating member of the machine tool organization to insure the same at all times traveling through the same predetermined path and in which wear on the parts may be readily taken up.

A further and specific object of the invention is the provision of an improved one-shot oiling system for simultaneously oiling or lubricating a plurality of bearings, particularly sliding bearings, at least once during each cycle of movement of the parts.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings:

Figure 1 is a front elevation of a machine tool embodying the improvements of this invention.

Figure 2 is a side elevation of the machine shown in Figure 1, and as seen particularly from the right hand side thereof.

Figure 3 is a fragmentary vertical sectional view as seen from line 3—3 on Figure 1.

Figure 4 is a transverse sectional view taken on line 4—4 of Figure 1.

Figure 5 is a fragmentary vertical sectional view taken on line 5—5 on Figure 4.

Figure 6 is a fragmentary horizontal sectional view taken on line 6—6 of Figure 2.

Figure 7 is a fragmentary sectional view taken at right angles to Figure 6 and as seen from lines 7—7 on Figure 2.

Figure 8 is a sectional view through the oil or lubricant distributing head as seen from line 8—8 on Figure 6.

Figure 9 is a view showing the coupling of the lubricating pipe to the reciprocating table ways as seen from line 9—9 on Figure 1.

Throughout the several views of the drawings similar reference characters are employed to denote the same or similar parts.

As noted above, this invention is primarily concerned with the proper and automatic lubrication of machine tool ways on which reciprocating members are disposed for movement relative thereto. The invention is illustrated in the drawings as used in connection with broaching machines of the vertical type, although it should not be restricted thereto as it has equal application to other types of machines.

Specifically, and as seen from the drawings, the broach comprises a base or bed 10 having rising therefrom a column 11. The base 10 forwardly of the column 11 is provided with guide ways 12 and 13, cooperating with similar ways provided on the undersurface of a reciprocating table 14. The table 14 has mounted thereon a pair of work fixtures 15 and 16 adapted to be alternately positioned with respect to the broaching tools so that the work pieces thereof are alternately operated upon. From this it will be seen that the work table 14 is reciprocable transversely of the base 10 and any suitable means may be employed for effecting said movement of the table.

The column 11 is provided along each side thereof with a guide face 17 formed between a gib 18 and a flange 19 integral with and projecting from the column. Received on said guide ways 17 are the cooperating guide members 20 integral with and projecting rearwardly of the broach ram 21. Only one of the guide members 20 is shown in the drawings and each is provided with a finished face 22 riding on the column guide ways 17, a second finished face 23 contacting with the adjacent guiding surface of the gib 18 and an outer guiding face 24. The guiding face 24 contacts with a finished inner face 25 of a gib 26. From the foregoing it will be seen that the ram 21 is suitably guided during its movement vertically of the column and is amply restrained to insure such movement, being at all times along a predetermined path.

In order to take up any wear that may develop on the finished guiding face 23 of the ram 21 the gib 18 is adjustable toward the same. The means for adjusting this gib comprises a slot 27 formed in the column 11 therebeneath and disposed at an angle to the vertical. Received in the slot 27 is a tongue 28 integral with and projecting from the gib 18 and disposed at the same angle to the vertical as the groove 27. It will be seen from Figure 5 that the groove 27 and tongue 28 are angularly disposed with relation to the face 23 of the gib 18. From this it follows that vertical movement of the gib 18 causes its guiding face to approach or recede from its cooperating guiding face 23 on the ram 21 and in view of the particular relation of the parts, as illustrated, a downward shifting of the gib 18 causes same to approach the ram guiding face.

In order to secure the gib in its adjusted position it is provided with a plurality of elongated apertures 29, through which pass clamping bolts 30 having their threaded ends received in tapped holes in the column.

In order to take up any wear that may develop either between the ram guiding face 22 and the column face 17 or the ram guiding face 25 and cooperating face of the gib 26 the said gib 26 is adjustable. For this purpose, and as seen in Figures 3 and 4, the outer surface of the column flange 19 is inclined as at 31. Cooperating with this inclined face 31 the gib 26 is provided with a leg 32 having its face inclined at the same angle as the angle of inclination of the flange face 31. By this construction the gib 26 is slightly L-shaped to provide the leg 32. It should be noted, however, that the cooperating angular faces of the gib leg 32 and surface 31 of the column flange is such that the guiding surfaces 25 and 17 respectively of the gib 26 in column 11 are at all times parallel. In order to secure the gib 26 in adjusted position it, similar to the gib 18, is provided with a plurality of elongated apertures 33 through each of which extends a clamping bolt 34 having its threaded end received in tapped holes formed in the column flange 19.

It will be appreciated that the length of travel of the ram 21 may be considerable thereby necessitating relatively long gibs such as 18 and 26. In order to facilitate the manufacture of these gibs they may be formed in several sections, each section being aligned with the succeeding section through a stepped joint such as shown at 35 and 36 in Figure 5. The foregoing description, and as seen particularly in the drawings, was for only one of the ram guides but it is to be understood that a duplicate of this mechanism is disposed at the other side thereof.

Any suitable or desirable means may be employed for effecting the vertical reciprocation of the ram 21, the means shown in the drawings comprising a piston and cylinder mechanism 37 connected to one or the other ends of the said ram. An hydraulic medium under pressure is employed to effect the operation of this mechanism, the medium deriving its pressure through the motor 38 carried by a motor bracket 39 associated with the column 11. Since the details of the mechanism necessary for reciprocating the ram 21, as well as the table 14, form no part of this invention they are not further shown or described herein.

The ways of the ram and table are adapted to be automatically lubricated at least once for each complete reciprocation thereof. This lubrication is effected automatically by the ram during its movement, preferably near the lower end thereof. The means for effecting the lubrication comprises a plunger pump 40 having a reduced pilot portion 41 and an enlarged piston portion 42. The reduced portion 41 of the plunger is mounted for sliding movement in a pilot bore in the housing 43 while the piston portion 42 is disposed in a piston bore or pump cylinder 44 also formed in the housing 43. The inner end of the pump cylinder 44 is closed as by a plug 45 which, in addition, forms one abutment for a spring 46 abutting on its other end with the plunger piston portion 42.

As seen in Figure 7 the housing 43 above the pump plunger 40 is enlarged to form an oil well or tank 47 having its upper end closed by a cover plate 48. The cover plate 48 is provided with a filling opening 49, into the upper end of which is threaded a plug 50, while depending from the lower end is a screen 51, the screen 51 being utilized for removing impurities from the lubricant prior to entering the well 47 and the screen being removable to permit a cleaning thereof.

Disposed in one of the side walls of the well 47 is a window or sight glass 52 through which the contents of the well may be viewed and which serves as an indicator to advise the operator when the lubricant within the well reaches a low point. The well 47 communicates with the pump plunger cylinder 44 by means of a duct or port 53 disposed near the outer end of said cylinder. This port or duct 53 is provided with a valve seat 54 for a ball check valve 55 which when in one position permits the suction or intake of lubricant from the well to the pump cylinder but prevents, when in a second position, the discharge of lubricant from the said cylinder into the oil well.

The pump cylinder 44 has also connected therewith one end of a duct or port 56 communicating with a duct or port 57 formed in the housing 43 below the pump cylinder. The other end of the duct or port 57 has screwed therein one end of a pipe 58 terminating on its other end in a lubricant distributor head 59.

The distributor head 59 has extending therefrom four delivery pipes 60, 61, 62 and 63 respectively terminating substantially midway of the ram guide ways and at the ways 12 and 13 for the work table 14 as seen particularly in Figures 1 and 2. Each of the delivery pipes, see Figure 8, where it enters the distributor head 59, communicates with a valve chamber 65 in which is disposed a spring loaded valve 66. The valves 66 are normally held to their seats to prevent any flow into or from said pipes except when the lubricant is under pressure for forcibly raising said valve and permitting access to said delivery pipes.

The connection of each of the delivery pipes 60 and 61 to its ram guide ways is identical for lubricating the three guiding surfaces 22, 23 and 24 of the ram. The connection of only one of said pipes is shown in the drawings in Figures 3, 4 and 5, and it is deemed sufficient for both the connections if this one be described in detail.

Accordingly, the column 11 has secured therein a bushing 67 in which is threaded the pipe coupling 68. The ram guide 22 is provided near its upper end with an elongated shallow depression 69 adapted to register with the bore from the bushing when the ram is in its lowermost position. Extending through the ram guide 22 from the rear guiding face 20 to the forward guiding face 24 is a bore or port 70. The port 70 communicates at its outer end with an oil groove 71 cut in the guiding surface 24 while at its inner end it is in communication with the elongated depression 69. Additionally, the elongated depression 69 communicates at one end with an oil groove 72 formed in the guiding surface 23 and the other end of said depression 69 communicates with an oil groove 73 formed in the guiding face 22. From the foregoing it is believed now evident that the ram guides are amply lubricated during each stroke of the ram.

The delivery pipes 62 and 63 which terminate at the table guides 12 and 13 are each, as shown in Figure 1, forked to supply lubricant at points 74 and 75 for each guide way which are disposed substantially midway between the center of the length of said ways and the ends thereof. Each coupling is identical, one of them being shown in Figure 9 and comprises a bushing 76 carried by the said table ways and having the inner end threaded for the piping coupling 77. The bore in the bushing 76 communicates with the guide way surfaces through a plurality of ports 78 projecting radially from the bore.

As was mentioned above, the pump plunger 40 is actuated to supply a shot or a given quantity of lubricant at least once for each reciprocation of the ram. The means for operating the said pump plunger is shown in Figure 6 and comprises a double arm lever 79 pivoted intermediate its length as at 80 between ears 81 projecting from a bracket 82 disposed adjacent the housing 43. The ball end 83 of the lever 79 contacts with the outer end of the pump plunger reduced portion 41, while the ball end 84, at the other end of the lever 79, contacts with an actuating plunger 85 disposed for sliding movement in a bore 86 in the bracket 82. The inner end of the actuating plunger 85 projects beyond the bracket 82 into the path of movement of a dog 87 secured to the side of the ram 17.

The operation of the improved automatic lubricating mechanism is as follows:

When the ram 17 nears the bottom of its stroke the cam or dog 87 thereon actuates the plunger 85 to the left as seen in Figure 6. This movement of the plunger 85 oscillates the lever 79 in a counterclockwise direction for actuating the pump plunger 40 to the right against the yielding resistance of the spring 46. The enlarged or piston portion 42 of the plunger in moving through its cylinder creates a vacuum ahead of it for drawing the ball check valve 55 from its seat and filling the pump cylinder 44 ahead of it with lubricant drawn through the port 53. At this time the valves 66 in the distributing head 59 are held against their seats by their associated springs, thereby preventing any drawing or sucking of lubricant that may be in the delivery pipes or distributor head into the pump cylinder. When the peak of the cam or dog 87 passes the plunger 85 the pump plunger 40 has been shifted to its innermost position and has drawn a sufficient quantity of lubricant from the well 47 to lubricate the ram and table guides.

As soon as the cam or dog 87 passes the actuating plunger the spring 46 expands, thereby shifting the pump plunger to the left as seen in Figures 6 and 7 for expelling the lubricant from the pump cylinder 45 ahead of the piston 44. This, of course, creates a pressure on the lubricant therein which closes the check valve 55 and forces the lubricant through the ports 46 and 57 and pipe 58 into the distributor head 59. The pressure on the lubricant at this time opens each of the valves 66, whereupon the lubricant is forced into and through the distributor pipes 60 to 63 inclusive to the different individual guide ways.

It should be noted that the discharge of the lubricant through the distributor pipes takes place when the ram is substantially in the position shown in Figure 3, that is, with the elongated depression 69 and port 70 in communication with the ends of the distributor pipes. The lubricant is then discharged from the depression 69 and port 70 to the oil grooves 71, 72 and 73.

Since the cam or dog 87 passes completely beyond the actuating plunger during the movement of the ram in one direction it naturally follows that upon reversal of the ram the plunger will be again actuated for thereby giving a second shot of lubricant to each of the guiding ways for each complete cycle of movement of the parts.

In order to control the quantity of lubricant to be delivered to the distributor head the throw or axial movement of the piston plunger 40 may be adjustably varied. The means for effecting this, as shown in Figure 6, comprises an adjustable abutment on the actuating plunger 85 in the nature of a headed screw or bolt 88 having the head 89 thereof contacting with the ball end 84 of the lever 79 instead of a direct contact between the plunger itself and the said end of the lever. The threads of the screw or bolt 88 are received in a threaded socket in the end of the plunger and additionally carry a lock nut 90 for securing the screw or bolt 88 in adjusted positions. From this it will follow that lost motion may be established between the end of the actuating plunger and lever 79 which must be first taken up before the pump piston plunger is actuated, thereby varying the travel of the said piston plunger and amount of lubricant drawn in and discharged by the piston for each stroke of the tool slide or ram.

To insure the discharge of the lubricant through each of the distributor pipes 60 to 63 inclusive and not all of the lubricant through one or two of the pipes, which would be the case if the resistance to flow through said pipes varied, means are provided to control this resistance in each pipe. The means for accomplishing this is best shown in Figure 8 and comprises a choke valve 91 in the port leading to each of the check valve chambers 65. The choke valves 91 are threaded through suitable apertures formed in the distributor head 59 and locked in position by suitable lock nuts 92. By individually adjusting the choke valves 91 the resistance to the flow of lubricant set up thereby combined with the resistance of their individual sliding bearing and distributor pipe insures each bearing receiving its proper amount of lubricant.

What is claimed is:

1. In a broaching machine or the like having ways and a member reciprocable on the ways, said member having a lubricant receiving recess formed therein and the ways having a lubricant discharged aperture disposed to aline with the recess during a portion of the stroke of the member, of means for intermittently effecting lubrication of the ways by way of the recess, including a plunger pump member and actuating means therefor including a shiftable rod, and a cam dog carried by the member in position to engage the rod for actuation of the pump when the recess of the member is substantially aligned with the discharge port of the ways whereby automatic periodic injection of lubricant into the recess is effected.

2. The combination with a broaching machine including a frame having vertical guideways and a broach ram vertically movable along said ways, of means for effecting intermittent lubrication of the ways including lubricant conduits having terminal portions intermediately disposed as respects the individual ways, a common distributor head for supplying lubricant to said conduits, means for determining the proportionate flow of lubricant through each of said conduits, an intermittently operable pump device for effecting pressure surges in the distributor in predetermined relation to the movement of the ram, said ram having lubricant receiving recesses formed therein adapted at a predetermined position in the stroke thereof to align with the lubricant conduits, and means carried by the ram in predetermined relation to the recesses for effecting pressure impulses in the distributor periodically as the receiving recesses of the ram are aligned with the discharged portion of the conduits.

3. A way lubricating device for machine tools or the like including a reservoir, a pump member in submerged position as respects the reservoir, a distributor coupled with the pump member having a plurality of lubricating conduits extending therefrom, means for determining the relative proportional flow of lubricant through the several conduits, an intermediately pivoted lever having one portion operatively associated with the pump for actuation thereof, a reciprocable plunger angularly disposed with respect to the lever, and operatively engaging the same for actuation of the lever and thereby the pump, said plunger having a projecting portion engageable by an element of the machine tool for imparting intermittent reciprocations thereto whereby the pump may be intermittently actuated for effecting prescribed discharge of lubricant through the conduits.

4. A way lubricating device for machine tools or the like including a reservoir, a pump member in submerged position as respects the reservoir, a distributor coupled with the pump member having a plurality of lubricating conduits extending therefrom, means for determining the relative proportional flow of lubricant through the several conduits, an intermediately pivoted lever having one portion operatively associated with the pump for actuation thereof, a reciprocable plunger angularly disposed with respect to the lever, and operatively engaging the same for actuation of the lever and thereby the pump, said plunger having a projecting portion engageable by an element of the machine tool for imparting intermittent reciprocations thereto whereby the pump may be intermittently actuated for effecting prescribed discharge of lubricant through the conduits, and means for varying the operative relationship of the lever engaging and actuable portions of the plunger whereby to vary the quantity of lubricant discharged by an individual pump actuation.

5. The combination with a broaching machine of the character described including an upright column provided with spaced opposed ways and a ram having guide portions clampingly received between the ways and reciprocable vertically therealong, of means for effecting intermittent lubrication of said interfitting parts including a pressure oiling system having discharged conduits entering one of the ways at a point corresponding to a depressed position of the upper portion of the ram member with respect thereto, said ram member having formed at the upper portion thereof a lubricant receiving chamber alignable with said discharge outlet when the ram is in depressed position, said ram being further formed with a transverse passage extending from said chamber to the opposite way confined guiding face thereof, said pressure system including a trip actuable device for controlling the fluid discharge therefrom, and means carried by the ram in position to engage said trip operable device as the recess of the ram moves into alignment with the discharge outlet whereby pressure lubrication from the oiling system will be effected through the recess passage only when the ram is in depressed position, substantially as and for the purpose described.

6. The combination with a broaching machine of the character described including an upright column provided with spaced opposed ways and a ram having guide portions clampingly received between the ways and reciprocable vertically therealong, of means for effecting intermittent lubrication of said interfitting parts including a pressure oiling system having discharged conduits entering one of the ways at a point corresponding to a depressed position of the upper porton of the ram member with respect thereto, said ram member having formed at the upper portion thereof a lubricant receiving chamber alignable with said discharge outlet when the ram is in depressed position, said ram being further formed with a transverse passage extending from said chamber to the opposite way confined guiding face thereof, said pressure system including a trip actuable device for controlling the fluid discharge therefrom, means carried by the ram in position to engage said trip operable device as the recess of the ram moves into alignment with the discharge outlet whereby pressure lubrication from the oiling system will be effected through the recess passage only when the ram is in depressed position, substantially as and for the purpose described, said ram guiding surfaces having supplemental downwardly extending oil grooves formed therein adjacent the aforesaid restraining ways whereby supplied lubricant is effectively applied to the ways during upward movement of the ram with respect to the prescribed lubricant receiving position thereof.

WALTER D. ARCHEA.